United States Patent
Imai et al.

(10) Patent No.: US 10,674,016 B2
(45) Date of Patent: Jun. 2, 2020

(54) APPARATUS, SYSTEMS, AND METHOD FOR CONFERENCE MANAGEMENT

(71) Applicant: LENOVO (Singapore) PTE. LTD., New Tech Park (SG)

(72) Inventors: Takumi Imai, Yokohama (JP); Masaru Nishiyama, Yokohama (JP); Nozomi Mandokoro, Yokohama (JP); Daisaku Morita, Yokohama (JP)

(73) Assignee: Lenovo (Singapore) PTE LTD, New Tech Park (SG)

( * ) Notice: Subject to any disclaimer, the term of this patent is extended or adjusted under 35 U.S.C. 154(b) by 6 days.

(21) Appl. No.: 16/024,104

(22) Filed: Jun. 29, 2018

(65) Prior Publication Data

US 2019/0007556 A1    Jan. 3, 2019

(30) Foreign Application Priority Data

Jun. 30, 2017   (JP) .................. 2017-129054

(51) Int. Cl.
*H04M 3/56* (2006.01)
*H04L 29/06* (2006.01)

(52) U.S. Cl.
CPC .......... *H04M 3/565* (2013.01); *H04L 65/403* (2013.01)

(58) Field of Classification Search
CPC ............................. H04L 65/403; H04M 3/565
See application file for complete search history.

(56) References Cited

U.S. PATENT DOCUMENTS

| | | | | |
|---|---|---|---|---|
| 2002/0002584 A1* | 1/2002 | Takagi | .................. | G06Q 10/10 709/204 |
| 2009/0316872 A1* | 12/2009 | Wolf | .................... | H04M 3/567 379/202.01 |
| 2012/0219140 A1* | 8/2012 | Iga | .......................... | G06Q 10/00 379/202.01 |
| 2014/0198173 A1* | 7/2014 | Willig | ...................... | H04N 7/15 348/14.03 |
| 2015/0007056 A1* | 1/2015 | Cohen | ................... | H04L 65/403 715/753 |
| 2015/0067026 A1* | 3/2015 | Christiansen | ....... | H04L 12/1831 709/203 |

FOREIGN PATENT DOCUMENTS

| | | |
|---|---|---|
| JP | 2005244332 A | 9/2005 |
| JP | 2011053629 A | 3/2011 |
| JP | 2014078098 A | 5/2014 |
| JP | 2014085916 A | 5/2014 |
| JP | 2014220619 A | 11/2014 |

* cited by examiner

*Primary Examiner* — Stephen J Clawson

(74) *Attorney, Agent, or Firm* — Kunzler Bean & Adamson

(57) ABSTRACT

Apparatus, systems, methods, and computer program products for determining an authentication procedure are disclosed. One apparatus includes a processor and a memory that stores code executable by the processor. The code is executable by the processor to acquire a schedule of a conference and a reference time which is determined on the basis of the schedule, recognize at least one voice of at least one participant who participates in the conference, determine whether the at least one voice of the at least one participant meets a predetermined condition after the elapse of the reference time, and output information for promoting progress of the conference in response to the determining whether the at least one voice of the at least one participant meets the predetermined condition after the elapse of the reference time.

17 Claims, 5 Drawing Sheets

APPARATUS, SYSTEMS, AND METHOD FOR CONFERENCE MANAGEMENT

CROSS-REFERENCE TO RELATED APPLICATIONS

This patent application claims priority to Japan Patent Application No. JP2017-129054, filed on 30 Jun. 2017 for Imai et al., the entire contents of which are incorporated herein by reference for all purposes.

FIELD

The present disclosure relates to apparatus, systems, methods, and computer program products for conference management.

BACKGROUND

A technique of managing a time schedule of a conference in which a plurality of persons participates by using a computer is currently used. In management of the time schedule of the conference, there are cases where a progress status of the conference becomes a managed object in addition to a start time and a finish time of the conference.

One technique describes a presentation support device that in a case where respective participants sequentially give presentations, an allotted time for the presentation of each participant is set in advance and a picture (or a screen) for promoting the finish of the presentation is projected onto a screen (or a projection screen) when expiration of the allotted time approaches.

SUMMARY

Various embodiments provide apparatus and systems for managing conferences. Further embodiments provide methods and computer program products related to such apparatus and systems.

In one embodiment, an apparatus includes a processor and a memory that stores code executable by the processor. The code is executable by the processor to acquire a schedule of a conference and a reference time which is determined on the basis of the schedule, recognize at least one voice of at least one participant who participates in the conference, determine whether the at least one voice of the at least one participant meets a predetermined condition after the elapse of the reference time, and output information for promoting progress of the conference in response to the determining whether the at least one voice of the at least one participant meets the predetermined condition after the elapse of the reference time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
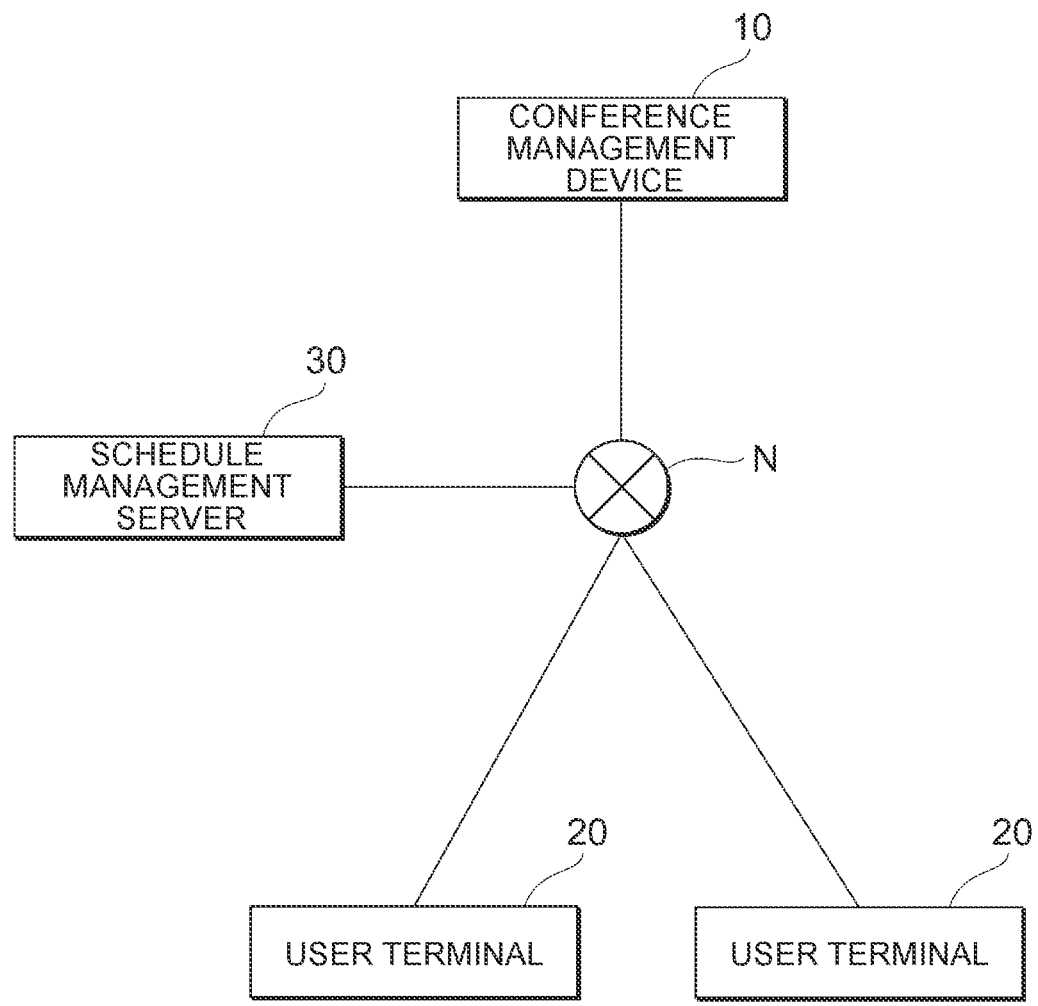
FIG. 1 is a schematic diagram illustrating one example of a network configuration of a conference management device according to one or more embodiments of the present disclosure.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code Many of the functional units described in this specification have been labeled as modules or units, in order to more particularly emphasize their implementation independence. For example, a module may be implemented as a hardware circuit comprising custom VLSI circuits or gate arrays, off-the-shelf semiconductors such as logic chips, transistors, or other discrete components. A module or unit may also be implemented in programmable hardware devices such as field programmable gate arrays, programmable array logic, programmable logic devices or the like.

Modules or units may also be implemented in code and/or software for execution by various types of processors. An identified module or unit of code may, for instance, comprise one or more physical or logical blocks of executable code which may, for instance, be organized as an object, procedure, or function. Nevertheless, the executables of an identified module or unit need not be physically located together, but may comprise disparate instructions stored in different locations which, when joined logically together, comprise the module and achieve the stated purpose for the module.

Indeed, a module or unit of code may be a single instruction, or many instructions, and may even be distributed over several different code segments, among different programs, and across several memory devices. Similarly, operational data may be identified and illustrated herein within modules or units, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Management may be conducted in such a manner that even in a case where a plurality of persons give presentations, each presentation is terminated in a scheduled time by the technique described in the background. However, when the picture for promoting the finish of the presentation is forcibly displayed at a time which is set by a timer, there are cases where forcible display of the information disturbs the presentation, the presenter, and the participants.

Accordingly, embodiments of the present invention aim to provide a conference management device, a conference management method and a conference management program which are able to manage the progress of the conference so as not to disturb the conference.

A conference management device according to one aspect of embodiments of the present invention includes an acquisition unit which acquires a schedule of a conference and a reference time which is determined on the basis of the schedule of the conference, a recognition unit which recognizes at least one voice of at least one participant who participates in the conference, a decision unit which decides whether the at least one voice of the at least one participant meets a predetermined condition after the elapse of the reference time and an output unit which outputs information for promoting progress of the conference in response to the determining whether the at least one voice of the at least one participant meets the predetermined condition after the elapse of the reference time.

According to the above-described aspect of embodiments of the present invention, the information for promoting the progress of the conference is output on the basis of the result of the decision as to whether the voice(s) of the participant(s) who participate(s) in the conference meet(s) the predetermined condition and thereby it is possible to avoid interruption of a presentation and a conversation and to manage the progress of the conference so as not to disturb the conference.

According to the above-described aspect of embodiments of the present invention, it is possible to provide the conference management device, the conference management method and the conference management program which are able to manage the progress of the conference so as not to disturb the conference.

Furthermore, the described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure.

Embodiments of the present invention will be described with reference to the appended drawings. Incidentally, in the respective drawings, constitutional elements to which the same symbols are assigned have the same or similar configurations.

In order to solve the above and other problems, the present disclosure adopts the following features in one or more embodiments.

FIG. 1 is a diagram illustrating one example of a network configuration of a conference management device 10 according to one or more embodiments of the present invention. The conference management device 10 is connected to a communication network N and is connected with a plurality of user terminals 20 and a schedule management server 30 over the communication network N. The communication network N may be a wired or wireless communication network and may an in-house LAN (Local Area Network), the Internet and so forth. The conference management device 10 may be a dedicated device and also may be a device which is configured in such a manner that a conference management program according to the present embodiment is installed in a memory of a general-purpose computer and the program concerned is executed by an arithmetic unit equipped in the computer thereby to exhibit various functions which will be described in the following.

The user terminal 20 may be a general-purpose computer and may be, for example, a laptop PC, a tablet terminal and so forth. One or a plurality of participant(s) who participates in a conference brings the user terminal(s) 20 with him/her/them respectively and connects the user terminal(s) 20 to the conference management device 10 over the communication network N. Incidentally, the participant(s) in the conference may not necessarily connect the user terminal(s) 20 to the conference management device 10 and the user terminals 20 that at least some participants use may be connected to the conference management device 10.

The schedule management server 30 manages a schedule which is concerned with a room used for the conference. The schedule management server 30 stores data indicating that the conference of what content is scheduled from what time to what time in a predetermined conference room into a storage unit. The schedule management server 30 may also store the name(s) of the participant(s) in the conference and materials to be presented in the conference into the storage unit together with the above-described data.

Figure 2:
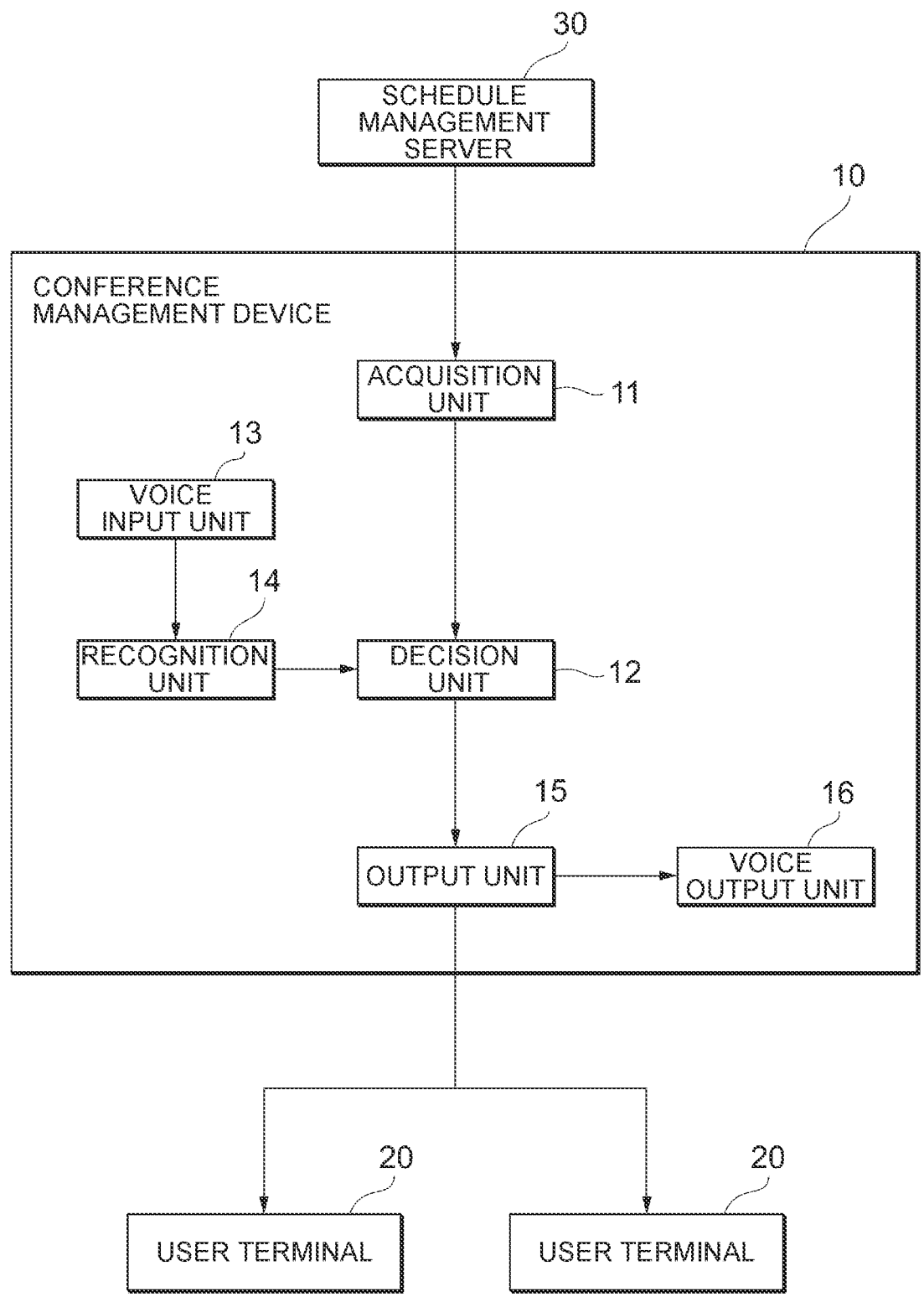
FIG. 2 is a block diagram illustrating one example of a functional block of the conference management device according to one or more embodiments of the present disclosure.

FIG. 2 is a block diagram illustrating one example of a functional block of the conference management device 10 according to one or more embodiments of the present invention. The conference management device 10 includes an acquisition unit 11, a decision unit 12, a voice input unit 13, a recognition unit 14, an output unit 15, a voice output unit 16 and so forth.

The acquisition unit 11 acquires the schedule of the conference and a reference time which is determined on the basis of the schedule of the conference from the schedule management server 30. Here, the schedule of the conference includes at least a start time and a finish time of the conference and may also include information such as designation of the conference room to be used, the name(s) of the participant(s), the order of presentations in a case where there is a plurality of presenters, a break time and so forth. In addition, the reference time is a time which is calculated on the basis of the finish time of the conference and whether the progress of the conference is behind the schedule. The reference time may be calculated by the schedule management server 30 and acquired by the conference management device 10. Alternatively, the conference management device 10 may be equipped with a calculation unit which calculates the reference time. The calculation may be based on how late a current presentation started relative to the current presentation's scheduled start time.

The decision unit 12 decides whether a voice or voices of one or a plurality of participant(s) who participates in the conference meet(s) a predetermined condition after the elapse of the reference time. Here, the voice of each participant is acquired by the voice input unit 13 which is configured by a microphone and so forth and is recognized by the recognition unit 14 which recognizes the voice(s) of one or the plurality of participant(s) who participates in the conference. Incidentally, at least the voice of each presenter who gives a presentation in the conference is recognized by the voice input unit 13 and the recognition unit 14.

A predetermined condition on the basis of which the decision unit 12 makes a determination may be absence of inputting of the voice(s) of the participant(s) over a predetermined period of time. In addition, the predetermined condition may be recognition of the voice of another participant.

In addition, in a case where it is not decided that the predetermined condition is met after the elapse of the reference time, the decision unit 12 may decide whether information for promoting the progress of the conference is to be forcibly output on the basis of the schedule of the conference. The conference management device 10 outputs the information for promoting the progress of the conference so as not to interrupt the statement of each participant in principle. However, in a case where there are unavoidable circumstances such as approaching of the finish time of the conference and so forth, the information for promoting the progress of the conference may be forcibly output even in a case where the voice(s) of the participant(s) do/does not meet the predetermined condition.

In some embodiments, the output unit 15 outputs the information for promoting the progress of the conference on the basis of a result of a determination made by the decision unit 12. Here, the information for promoting the progress of the conference is information for promoting to accelerate the progress of the conference and, alternatively, may be information for warning of stagnation of the progress of the conference, information for warning that there is little time left for the conference and so forth. The output unit 15 may output the information for promoting the progress of the conference using a voice. In this case, the output unit 15 outputs voice data to the voice output unit 16 and the voice for promoting the progress of the conference is output from the voice output unit 16 which is configured by a loudspeaker and so forth.

The output unit 15 may output the information for promoting the progress of the conference to a display unit. Here, the display unit may be a projector which projects a picture onto a screen, may be the display unit of the user terminal 20 that one participant who is now making a statement uses in the participants in the conference and/or may be the display unit(s) of one or the plurality of user terminal(s) 20 that one or the respective participants in the conference use(s).

Figure 3:
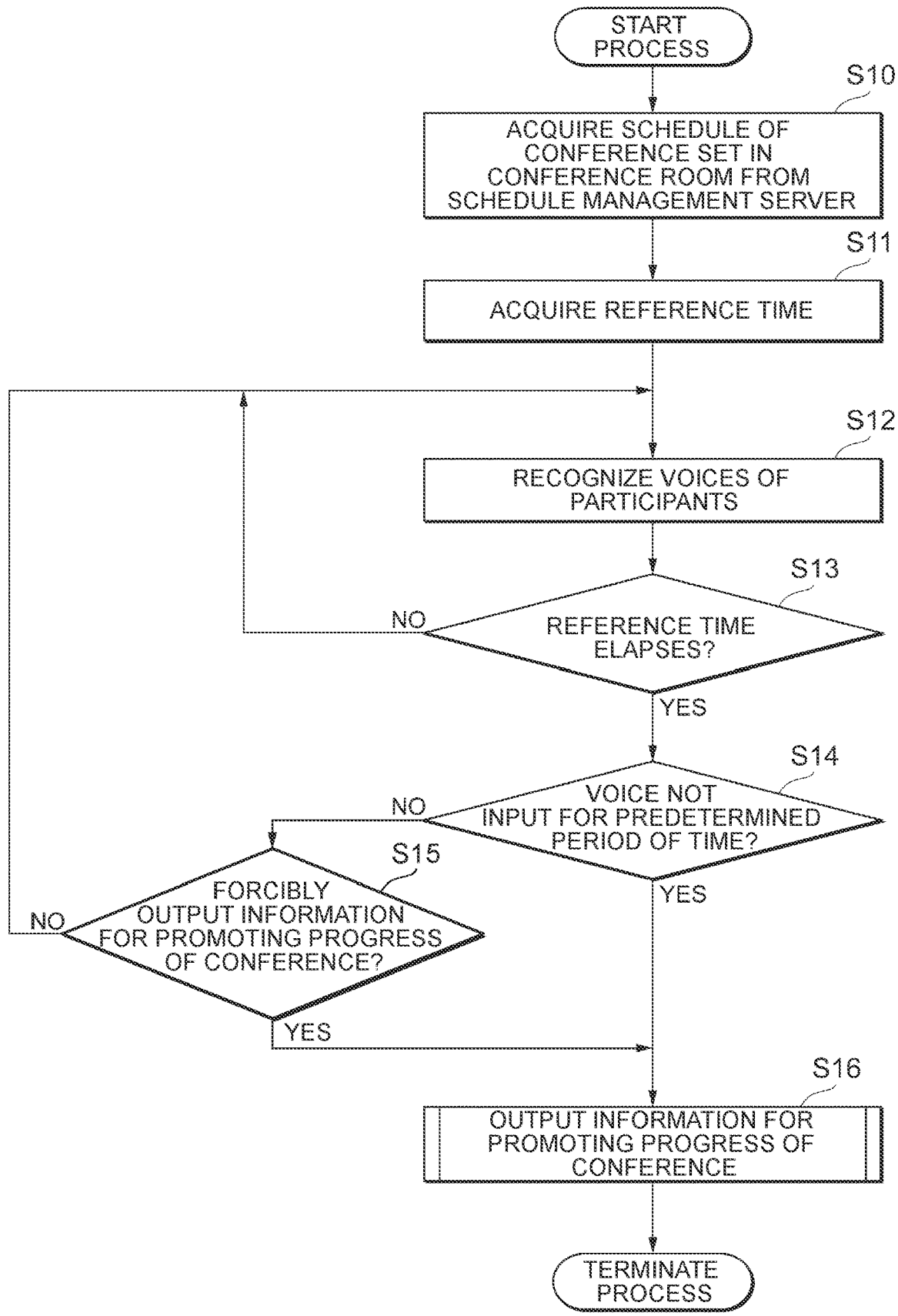
FIG. 3 is a schematic flowchart diagram illustrating one example of a first process which is executed by the conference management device according to one or more embodiments of the present disclosure.

FIG. 3 is a flowchart illustrating one example of a first process executed by the conference management device 10 according to one or more embodiments of the present invention. The first process is a process of outputting the information for promoting the progress of the conference in a case where the voice(s) of the participant(s) in the conference is/are not output over the predetermined period of time.

First, the conference management device 10 acquires the schedule of the conference which is set in the conference room concerned from the schedule management server 30 using the acquisition unit 11 (S10). Further, the conference management device 10 acquires the reference time calculated by the schedule management server 30 (S11).

When the conference is started, the conference management device 10 recognizes the voice(s) of the participant(s) using the voice input unit 13 and the recognition unit 14 (S12). Then, whether the reference time elapses is decided by the decision unit 12 (S13). In a case where the reference time does not elapse (S13: No), recognition of the voice(s) of the participant(s) is continuously performed (S12). On the other hand, in a case where the reference time elapses (S13: Yes), whether the voice(s) of the participant(s) in the conference meet(s) the predetermined condition is decided. In a case of the first process, the decision unit 12 decides whether the voice(s) of the participant(s) is/are not input over the predetermined period of time (S14).

In a case where it is decided that the voice(s) of the participant(s) is/are not input over the predetermined period of time (S14: Yes), the information for promoting the progress of the conference is output from the output unit 15 (S16). The step of outputting the information for promoting the progress of the conference will be described in detail by using FIG. 4.

On the other hand, in a case where it is decided that the voice(s) of the participant(s) is/are input over the predetermined period of time (S14: No), that is, in a case where the next voice is input before the predetermined period of time elapses irrespective of suspension of inputting of the voice(s) of the participant(s), the decision unit 12 decides whether the information for promoting the progress of the conference is to be forcibly output on the basis of the schedule of the conference (S15).

In a case where it is decided not to forcibly output the information for promoting the progress of the conference (S15: No), recognition of the voice(s) of the participant(s) is continuously performed (S12). For example, in a case where although the reference time elapses, certain time is still left until the finish of the conference and there is time which is enough to wait for a timing that inputting of the voice(s) of the participant(s) is suspended, it may be decided not to forcibly output the information for promoting the progress of the conference. On the other hand, in a case where it is decided to forcibly output the information for promoting the progress of the conference (S15: Yes), the information for promoting the progress of the conference is output from the output unit 15 regardless of whether the voice(s) of the participant(s) meet(s) the predetermined condition (S16). For example, in a case where the reference time elapses, there is little time left until the finish of the conference and there is no time which is enough to wait for the timing that inputting of the voice(s) of the participant(s) is suspended, it may be decided to forcibly output the information for promoting the progress of the conference. Execution of the first process is terminated in the above-described way.

According to the conference management device 10 pertaining to the present embodiment, interruption of the presentations and the conversations is avoided by outputting the information for promoting the progress of the conference on the basis of the result of decision as to whether the voice(s) of the participant(s) who participate(s) in the conference meet(s) the predetermined condition and thereby it is possible to manage the progress of the conference so as not to disturb the conference.

In addition, it is possible to output the information for promoting the progress of the conference at a timing which does not overlap a timing that the participant concerned utters his/her voice by deciding whether the voice(s) is/are not input over the predetermined period of time and thereby it is possible to manage the progress of the conference so as not to disturb the conference.

Further, even in a case where the voice(s) of the participant(s) who participate(s) in the conference do/does meet the predetermined condition, the information for promoting the progress of the conference is forcibly output on the basis of the schedule of the conference and thereby it is possible to promote the progress of the conference.

Figure 4:
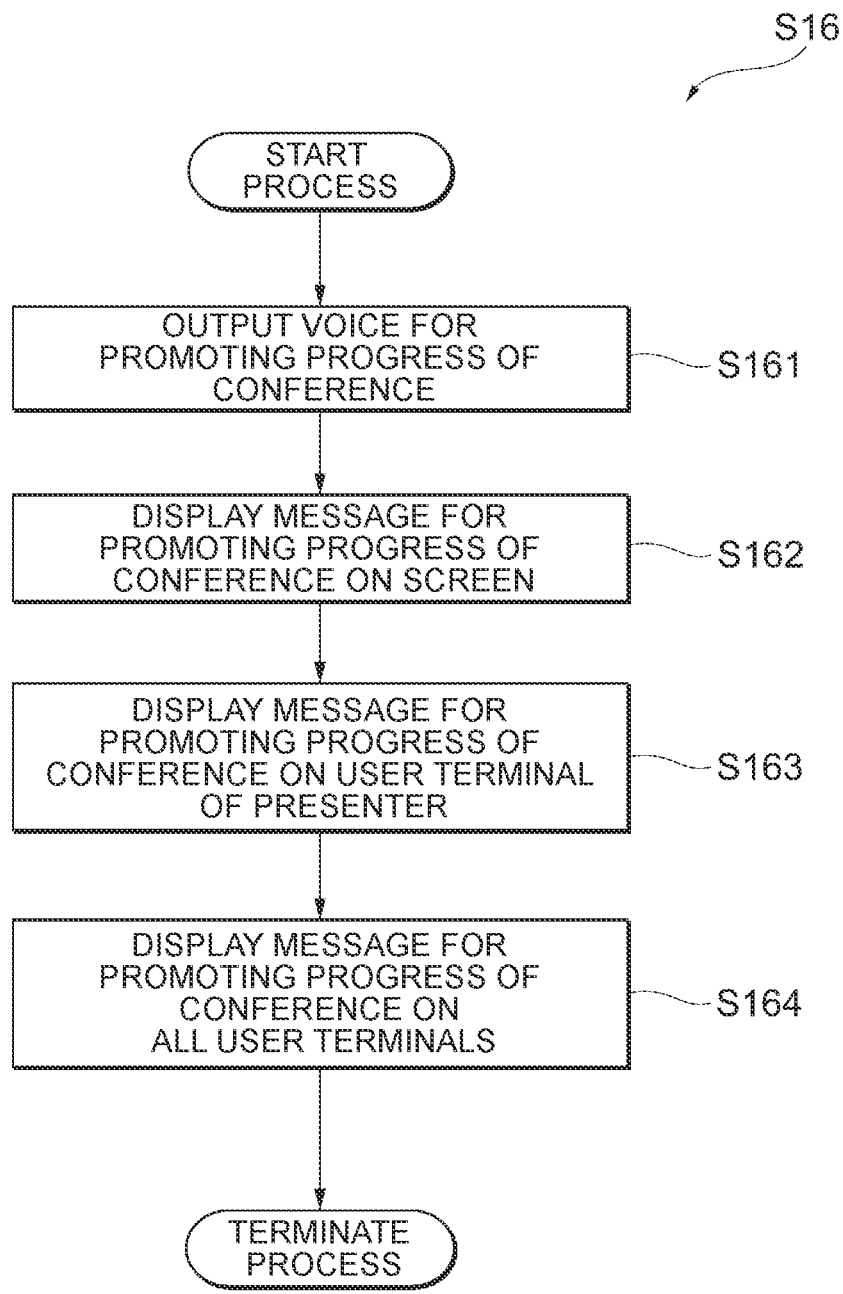
FIG. 4 is a schematic flowchart diagram illustrating one example of a second process which is executed by the conference management device according to one or more embodiments of the present disclosure.

FIG. 4 is a flowchart illustrating one example of a second process which is executed by the conference management device 10 according to some embodiments of the present invention. The second process corresponds to the step (S16) of outputting the information for promoting the progress of the conference by the conference management device 10 illustrated in FIG. 3.

The conference management device 10 outputs the voice for promoting the progress of the conference from the voice output unit 16 (S161). The voice may include such contents that, for example, acceleration of the progress of the conference is promoted because the progress of the conference is behind schedule, approaching of the finish time of the conference is warned and so forth.

Even in a case where the participant(s) does/do not necessarily fix his/her/their eye(s) on visually recognizable information, it is possible to inform the participant(s) of delay of the progress of the conference by outputting the information for promoting the progress of the conference by using the voice and thereby it is possible to promote the progress of the conference.

The conference management device 10 outputs a message (information) for promoting the progress of the conference from the output unit 15 to a projector and makes the projector display the message for promoting the progress of the conference on the screen (or the projection screen) (S162). It is possible to promote the progress of the conference without interrupting the presentation made by the presenter in the conference and the conversation(s) of the participant(s) in the conference by outputting the information for promoting the progress of the conference to the display unit in this way.

In addition, the conference management device 10 displays the message for promoting the progress of the conference on the display unit of the user terminal 20 of a speaker (for example, the presenter) (S163). It is possible to promote the progress of the conference without disturbing visual recognition of the display units by the participants who do not make statements by outputting the information for promoting the progress of the conference to the display unit of the user terminal 20 that the participant who is now making the statement uses.

Further, the conference management device 10 displays the message for promoting the progress of the conference on the display units of all the user terminals 20 (S164). It is possible to inform the participants who do not make the statements of delay of the progress of the conference by outputting the information for promoting the progress of the conference to the display unit or the respective display units of one or the plurality of user terminal(s) 20 and thereby it is possible to promote the progress of the conference. Execution of the second process is terminated in the above-described way.

Incidentally, in the example illustrated in FIG. 4, the information for promoting the progress of the conference is output by using the voice (S161), is displayed as the message on the screen (S162), is displayed on the display unit of the user terminal 20 of the speaker (S163) and is displayed on the display units of all the user terminals 20 (S164). However, the conference management device 10 may not necessarily execute all the four steps, may execute at least any one of them and/or may execute optional steps in combination.

Figure 5:
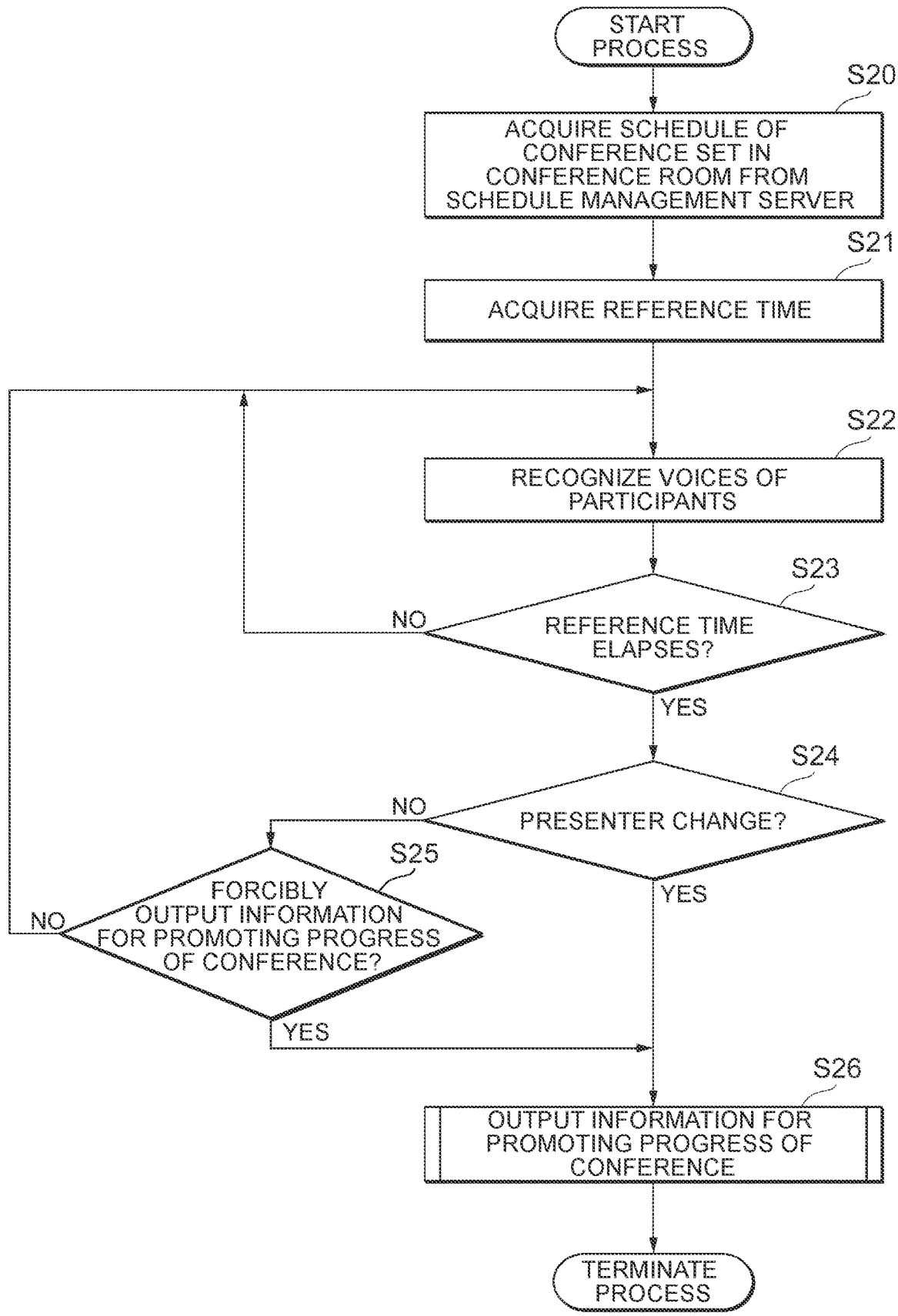
FIG. 5 is a schematic flowchart diagram illustrating one example of a third process which is executed by the conference management device according to one or more embodiments of the present disclosure.

FIG. 5 is a flowchart illustrating one example of a third process which is executed by the conference management device 10 according to the embodiment of the present invention. The third process is a process of outputting the information for promoting the progress of the conference in a case of changing the participant who utters the voice or, in other words, changing the presenter.

First, the conference management device 10 acquires the schedule of the conference which is set in the conference room concerned from the schedule management server 30 using the acquisition unit 11 (S20). Further, the conference management device 10 acquires the reference time which is calculated by the schedule management server 30 (S21).

When the conference is started, the conference management device 10 recognizes the voice(s) of the participant(s) using the voice input unit 13 and the recognition unit 14 (S22). Then, whether the reference time elapses is decided by the decision unit 12 (S23). In a case where the reference time does not elapse (S23: No), recognition of the voice(s) of the participant(s) is continuously performed (S22). On the other hand, in a case where the reference time elapses (S23: Yes), whether the voice(s) of the participant(s) in the conference meet(s) the predetermined condition is decided. In a case of the third process, the decision unit 12 decides whether the participant (the speaker) who utters the voice changes (S24), or, in other words, whether a new presenter is speaking.

In a case where changing of the speaker is decided (S24: Yes), the information for promoting the progress of the conference is output from the output unit 15 (S26). The step (S26) of outputting the information for promoting the progress of the conference corresponds to the step (S16) which is described using FIG. 3.

On the other hand, in a case where it is decided that the speaker does not change (S24: No), that is, in a case where a specific participant continuously makes the statement and it is decided that there is no chance of shifting to the statement of another participant, the decision unit 12 decides whether the information for promoting the progress of the conference is to be forcibly output on the basis of the schedule of the conference (S25).

In a case where it is decided not to forcibly output information for promoting the progress of the conference (S25: No), recognition of the voice(s) of the participant(s) is continuously performed (S22). For example, in a case where although the reference time elapses, certain time is still left until the finish of the conference and there is time which is enough to wait for a timing that the speaker will change, it may be decided not to forcibly output the information for promoting the progress of the conference. On the other hand, in a case where it is decided that the information for promoting the progress of the conference is to be forcibly output (S25: Yes), the information for promoting the progress of the conference is output from the output unit 15 regardless of whether the voice(s) of the participant(s) meet(s) the predetermined condition (S26). For example, in a case where the reference time elapses, there is little time left until the finish of the conference and there is no time which is enough to wait for the timing that the speaker will change, it may be decided that the information for promoting the progress of the conference is to be forcibly output. Execution of the third process is terminated in the above-described way.

According to the conference management device 10 pertaining to the present embodiment, it is possible to output the information for promoting the progress of the conference at a timing that the participants make the statements sufficiently for the time being by deciding whether the participant who utters the voice will change and thereby it is possible to manage the progress of the conference so as not to disturb the conference. Incidentally, in the example illustrated in FIG. 5, a method of deciding change of the speaker (the participant who utters the voice) is described as a method of detecting the timing that the participants make the statements sufficiently for the time being. In addition, a technique of detecting that the user terminal 20 which is connected to the conference management device 10 and outputs the information to the projector changes may be also used as another method of detecting the timing that the participants make the statements sufficiently for the time being.

The above-described embodiments are made for illustrative purposes and are not made for limiting the interpretation of other embodiments of the present invention. Respective elements that the embodiments including arrangements, materials, conditions, shapes, sizes and so forth of the elements are not limited to the ones which are exemplarily illustrated in the drawings and may be appropriately altered and modified. In addition, it is possible to partially displace and/or combine configurations which are described in different embodiments with each other or one another.

Although various embodiments have been described herein, the technical scope of the various embodiments are not limited to the scope specifically described above. That is, various modifications and/or improvements may be made to the various embodiments without departing from the spirit of this disclosure. As such, embodiments in which modifications and/or improvements have been made are also included in the technical scope of the various embodiments.

The foregoing description has been directed to various embodiments illustrated in the drawings. The scope of the various embodiments, however, is not limited to the illustrated embodiments, and may, of course, employ any known configuration as long as the advantages of the various embodiments can be obtained. Furthermore, the flow of the methods described in the above embodiments are merely an example, and an unnecessary block may be deleted, a new block may be added, and/or a processing order may be changed without departing from the spirit of the method.

What is claimed is:

1. An apparatus, comprising:
a processor; and
a memory that stores code executable by the processor to:
acquire a schedule of a conference and a reference time which is determined on the basis of the schedule, wherein the conference comprises a plurality of presentations, and wherein the schedule comprises a finish time for each of the plurality of presentations;
recognize a voice of at least one participant who participates in the conference;
determine, after an elapse of the reference time, whether the voice of the at least one participant meets a predetermined condition;
output information for promoting progress of the conference, in response to a determination that the voice of the at least one participant meets the predetermined condition; and
output information for promoting progress of the conference based on the finish time of at least one of the plurality of presentations, in response to the determination that the voice of the at least one participant does not meet the predetermined condition.

2. The apparatus of claim 1, wherein the predetermined condition is that the voice is not input over a predetermined period of time.

3. The apparatus of claim 1, further comprising code executable to recognize a second voice of a second participant, and wherein the predetermined condition is recognition of the second voice.

4. The apparatus of claim 1, wherein the code is further executable by the processor to output the information by a voice output unit.

5. The apparatus of claim 1, wherein the code is further executable by the processor to output the information to a display unit.

6. The apparatus of claim 1, wherein the code is further executable by the processor to output the information to a display unit of a user terminal of the at least one participant.

7. The apparatus of claim 1, wherein the code is further executable by the processor to output the information to at least one display unit of at least one user terminal that the at least one participant uses.

8. A method, comprising:
acquiring a schedule of a conference and a reference time which is determined on the basis of the schedule, wherein the conference comprises a plurality of presentations, and wherein the schedule comprises a finish time for each of the plurality of presentations;
recognizing a voice of at least one participant who participates in the conference;
determining, after an elapse of the reference time, whether the voice of the at least one participant meets a predetermined condition;
outputting information for promoting progress of the conference in response to a determination that the voice of the at least one participant meets the predetermined condition; and
outputting information for promoting progress of the conference based on the finish time of at least one of the plurality of presentations, in response to the determination that the voice of the at least one participant does not meet the predetermined condition.

9. The method of claim 8, wherein the predetermined condition is that the voice is not input over a predetermined period of time.

10. The method of claim 8, further comprising recognizing a second voice of a second participant, and wherein the predetermined condition is recognition of the second voice.

11. The method of claim 8, further comprising outputting the information by a voice output unit.

12. The method of claim 8, further comprising outputting the information to a display unit.

13. The method of claim 8, further comprising outputting the information to a display unit of a user terminal of the at least one participant.

14. A computer storage device that stores code executable by a processor, the executable code comprising code to perform:
acquiring, by use of the processor, a schedule of a conference and a reference time which is determined on the basis of the schedule, wherein the conference comprises a plurality of presentations, and wherein the schedule comprises a finish time for each of the plurality of presentations;

recognizing a voice of at least one participant who participates in the conference;

determining, after an elapse of the reference time, whether the voice of the at least one participant meets a predetermined condition;

outputting information for promoting progress of the conference in response to a determination that the voice of the at least one participant meets the predetermined condition; and outputting information for promoting progress of the conference based on the finish time of at least one of the plurality of presentations, in response to the determination that the voice of the at least one participant does not meet the predetermined condition.

15. The computer storage device of claim 14, wherein the predetermined condition is that the voice is not input over a predetermined period of time.

16. The computer storage device of claim 14, further comprising code executable to recognize a second voice of a second participant, and wherein the predetermined condition is recognition of the second voice.

17. The computer storage device of claim 14, wherein the executable code further comprises code to perform outputting the information to a display unit of a user terminal of the at least one participant.

* * * * *